UNITED STATES PATENT OFFICE.

JOHN C. JESSUP, OF DIGHTON, MASSACHUSETTS, ASSIGNOR TO MASON, CHAPIN & CO., OF PROVIDENCE, RHODE ISLAND.

PROCESS OF MAKING PARIS-GREEN.

SPECIFICATION forming part of Letters Patent No. 451,487, dated May 5, 1891.

Application filed February 24, 1890. Serial No. 341,564. (No specimens.)

*To all whom it may concern:*

Be it known that I, JOHN C. JESSUP, of Dighton, in the county of Bristol and State of Massachusetts, have invented a certain new and useful Method for Manufacturing Paris-Green; and I do hereby declare that the following specification is a full, true, and exact description thereof.

In the processes heretofore employed for making paris-green it has been customary, among the other steps of the process, to first prepare sulphate of copper in crystalline form, known in commerce as "blue-vitriol," and then to dissolve these crystals in water to produce the solution to be used in the subsequent steps of the manufacture. This process was an expensive one, not only by reason of the time, labor, and fuel required to thus crystallize the sulphate of copper and subsequently dissolve it, but also by reason of the fact that in the crystallization of the sulphate of copper mother-liquors are obtained, which contain some sulphate of copper, together with a greater or less quantity of impurities. The compounds of copper contained in these mother-liquors are difficult to obtain therefrom and much expense is necessary to separate them from the impurities which are present.

The object of my invention is to simplify and to cheapen the manufacture of paris-green; and to that end my invention consists in an improved and continuous process, as hereinafter described, in which I omit altogether the steps heretofore employed of first crystallizing the sulphate of copper and then dissolving it, thereby effecting a great saving in time, labor, and fuel, and by which I am able to separate and secure practically all the copper in solution free from impurities and at much less cost than has been heretofore possible.

In carrying out my improved process I first subject a suitable quantity of what is known as "copper residue" to the action of sulphuric acid, thereby producing a solution of sulphate of copper. It is desirable for the purposes of my invention that this solution of sulphate of copper should be neutral, or nearly so. This neutrality may be secured by employing a slight excess of oxide of copper in the formation of the solution, which excess will remain at the bottom of the tank. If, however, the desired neutrality has not been secured in the original preparation of the solution, it may be subsequently obtained by neutralizing any slight excess of sulphuric acid by means of caustic soda or other suitable alkali. When the solution has been prepared, it is allowed to settle. The clear liquid is then drawn off in suitable quantity into another tank, commonly called the "striking" tank. Water is then added in sufficient quantity to obtain the requisite bulk of liquid for the subsequent operations. Next a solution of arsenite of soda, previously prepared, is introduced into the liquor in the striking-tank in the proper quantity to correspond with the amount of copper already present. The proper proportions are about sixty-six (66) pounds of white arsenic, dissolved in soda in the usual way, for each twenty-four (24) pounds of pure oxide of copper contained in the copper residue employed. Next acetic acid is added in amount judged sufficient by the manufacturer. In practice I have found that about forty-five (45) pounds of No. 8 commercial acid is suitable for the amounts of copper and arsenic above specified. The mixture thus formed is then stirred and allowed to settle. The stirring is repeated from time to time until the paris-green has formed with the requisite color. The product is then treated in the usual way to prepare it for the market.

As will be seen, the process above described is continuous and dispenses entirely with the steps of crystallization and subsequent dissolving of the sulphate of copper, whereby a great saving of time, labor, and fuel is secured. Moreover, by introducing the arsenite of soda and acetic acid directly into the solution of copper and without first crystallizing it I avoid the mother-liquors with their contained impurities and am able to separate and secure practically all the copper in solution and render it available in the production of paris-green, for the reason that the arsenite of soda and acetic acid will draw out of the solution practically all the copper there is in it. Not only is a greater amount of copper thus secured and made available than heretofore, but the cost of obtaining it is reduced. As there is no crystallization and no mother-liquors, the expense heretofore incurred in securing the copper from the mother-liquors and separating it from the accompanying impurities is entirely saved. Furthermore, as the process is simpler and composed of less steps than those heretofore employed, less and simpler apparatus is required for working it, thereby effecting a saving in the cost of the plant for carrying on the manufacture.

By the term "copper residue," as hereinbefore employed, I refer to a commercial article containing oxide of copper. I do not wish to be understood, however, as confining myself to this article from which to prepare the copper solution, as in place thereof I may make use of any of a variety of cheap substances containing copper in a form soluble in sulphuric acid, such as the article known as "copper scales," for example.

What I claim as my invention, and desire to secure by Letters Patent, is—

The improved process for manufacturing paris-green, which consists in first preparing a solution of sulphate of copper by subjecting a suitable quantity of copper residue or other crude materials containing copper to the action of sulphuric acid and then introducing directly into the solution thus obtained the proper quantities of arsenite of soda and acetic acid, substantially as set forth.

JOHN C. JESSUP.

Witnesses:
W. H. THURSTON,
S. J. MURPHY.